O. W. RANDOLPH.
GRAIN DRIER.
APPLICATION FILED OCT. 13, 1916.
1,239,216.
Patented Sept. 4, 1917.
5 SHEETS—SHEET 1.
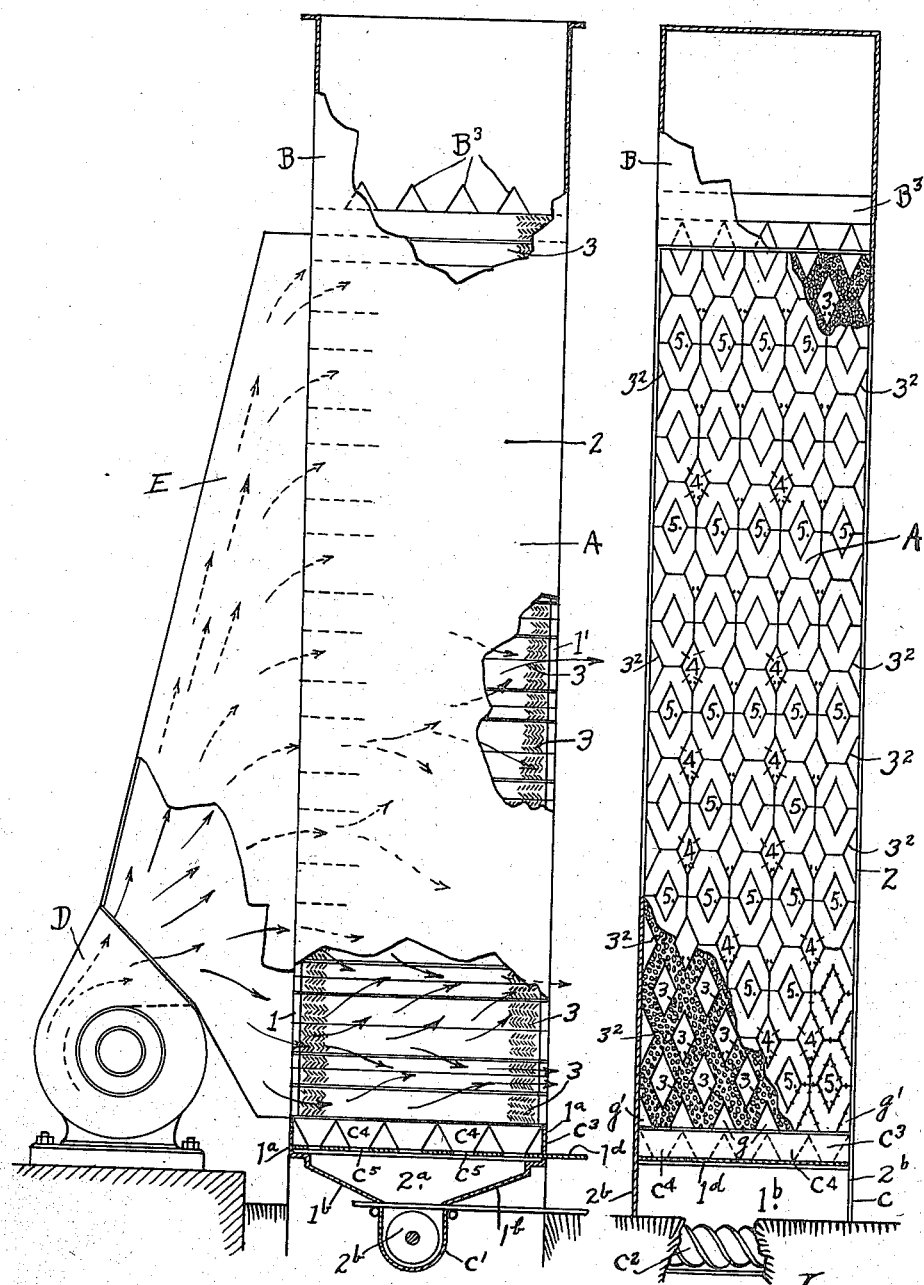

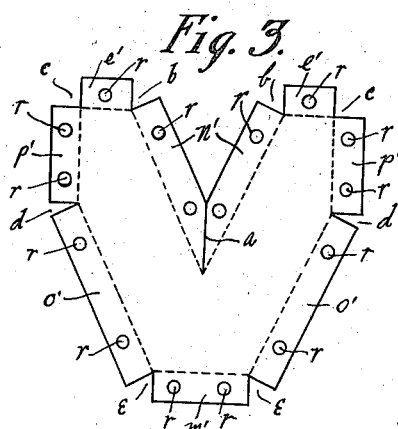
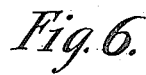
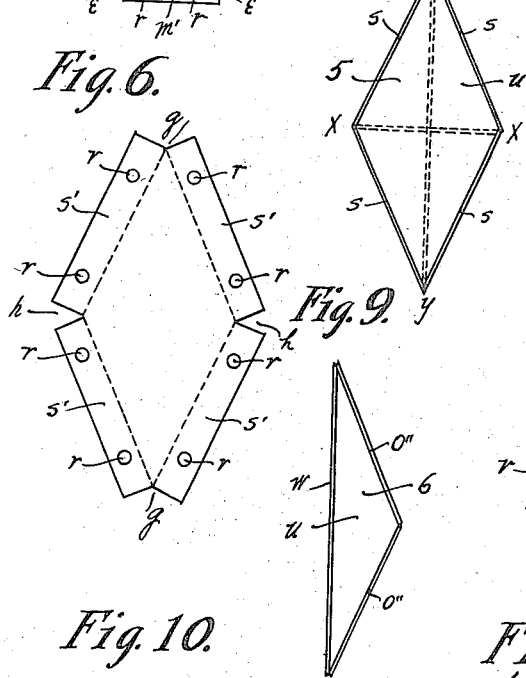
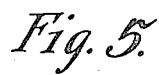
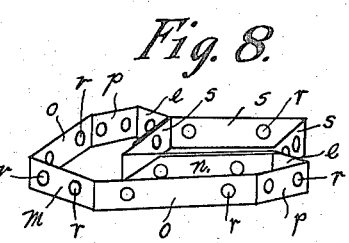
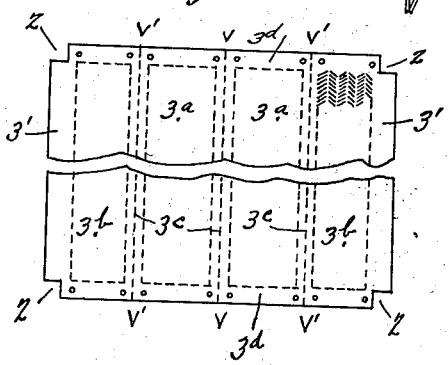
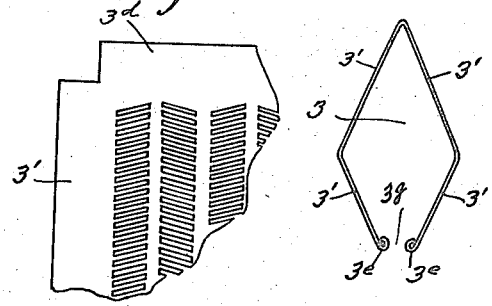

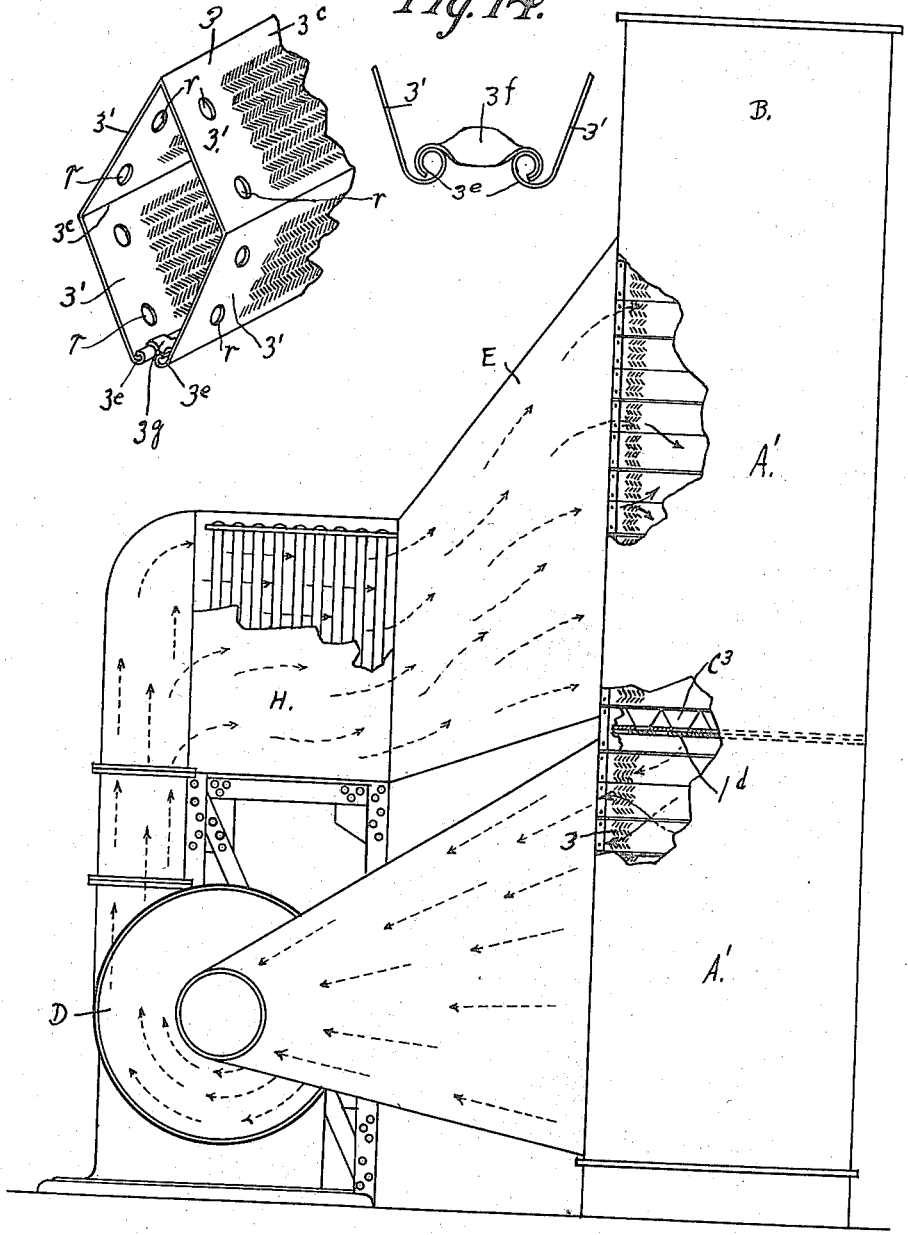

O. W. RANDOLPH.
GRAIN DRIER.
APPLICATION FILED OCT. 13, 1916.

1,239,216.

Patented Sept. 4, 1917.
5 SHEETS—SHEET 4.

Inventor
Oliver W. Randolph
by Robt. B. Wilson
Attorney

O. W. RANDOLPH.
GRAIN DRIER.
APPLICATION FILED OCT. 13, 1916.

1,239,216.

Patented Sept. 4, 1917.
5 SHEETS—SHEET 5.

Inventor.
Oliver W. Randolph
by Robt. B. Wilson
Attorney

UNITED STATES PATENT OFFICE.

OLIVER W. RANDOLPH, OF TOLEDO, OHIO.

GRAIN-DRIER.

1,239,216.　　　　　Specification of Letters Patent.　　Patented Sept. 4, 1917.

Application filed October 13, 1916. Serial No. 125,495.

*To all whom it may concern:*

Be it known that I, OLIVER W. RANDOLPH, a citizen of the United States, residing at Toledo, in the county of Lucas and State of Ohio, have invented new and useful Improvements in Grain-Driers, of which the following is a specification.

My invention relates to improvements in a grain drier, and has for its object to provide a grain drier that is adapted to be built up of simple units of construction that are readily and economically constructed and assembled together to form a complete drier, that is (1) adapted to rapidly and uniformly dry grain in passing through it, (2) that is economical as to the heat and power required to operate it, (3) that is self-cleaning, (4) that is adapted for the ready removal of any worn part and the substitution of an unworn like part, without disturbing any other part, (5) that has increased drying capacity per unit of space occupied, and (6) that is adapted to be readily increased to any desired capacity by adding units of construction and proportionately increasing the heating and power capacity.

I accomplish these objects by the construction and combination of parts as hereinafter described and illustrated in the drawings, in which—

Figure 1 is an end elevation of a drier constructed in accordance with my invention, with the air blower attached.

Fig. 2 is a side elevation of the same with the blower removed.

Fig. 3 shows a blank of sheet metal for forming a unit of construction.

Fig. 4 is a side elevation of the completed unit formed from the blank shown in Fig. 3.

Fig. 5 is an end view of the same.

Fig. 6 is a form of sheet metal blank adapted for forming a unit of construction.

Fig. 7 is a completed unit of construction formed from the blank shown in Fig. 6.

Fig. 8 is a perspective view of the units of construction shown in Figs. 4 and 7 assembled together.

Fig. 9 shows a side elevation of a unit of construction.

Fig. 10 shows a form of a blank of sheet metal provided with herring-boned perforations adapted for forming a screen unit.

Fig. 11 is a broken away enlarged portion of the same.

Fig. 12 is an end view of the diamond shaped screen unit formed of the blank shown in Fig. 10.

Fig. 13 is an enlarged broken away perspective view of the same.

Fig. 14 shows a detail of construction of the lower portion of the same.

Fig. 15 is an end elevation of a combined drier and cooler constructed in accordance with my invention with a blower and heater connected thereto.

Figure 25:
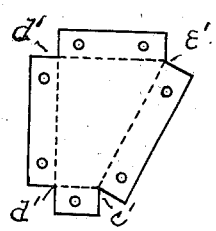
Figures 21, 23:
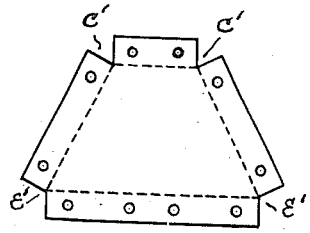
Fig. 21 is a plan view of a blank for forming a modified form of unit for forming modified forms of the air inlet and outlet sides of the main body of the drier.

Figs. 23 and 25 respectively show blanks for forming right and left half units.

Figure 26:
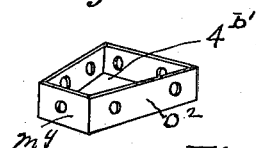
Figures 22, 24:
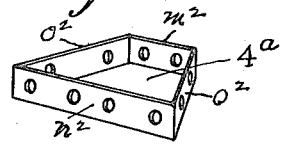
Fig. 22 is a perspective view of the unit formed of the blank shown in Fig. 21.
Figure 27:
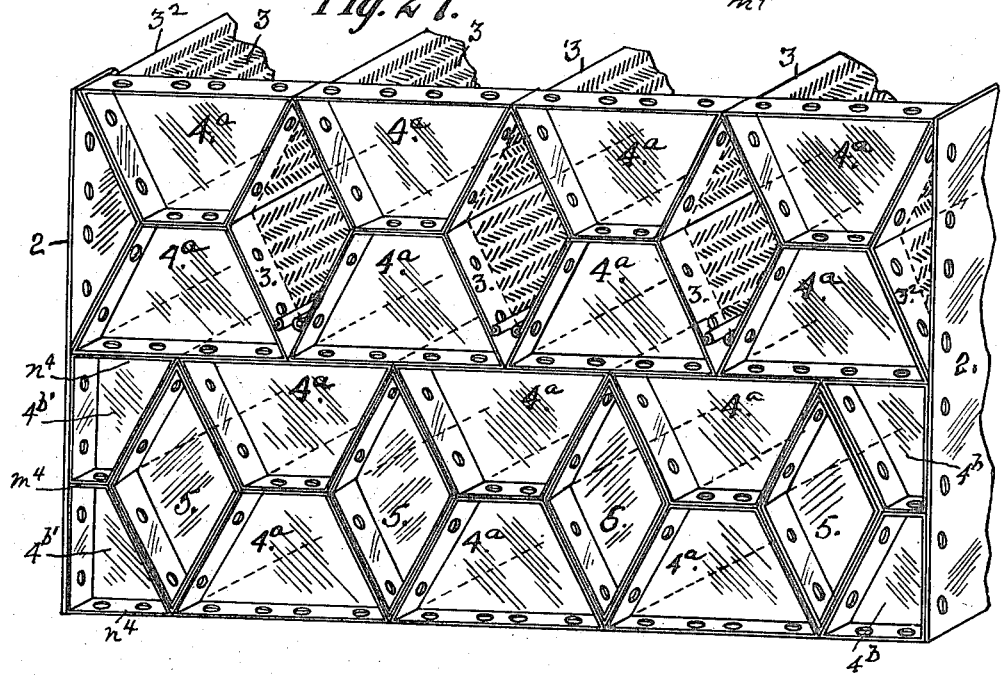

Figs. 24 and 26 are respectively perspective views of the units formed from the blank shown in Figs. 23 and 25, and Fig. 27 shows a broken away portion of the air outlet side of the main body portion of the drier constructed of the modified forms of the units shown in Figs. 22, 24 and 26.

In the drawings A designates the main body portion of the drier, B the receiving hopper at the top end of the main body A.

The main body part A is formed of the air inlet side 1, the outlet side 1', the end plates 2, and the screen units 3 cross connecting the sides 1 and 1'.

The sides 1 and 1' are built up from a multiplicity of complementary units 4, 5, 6 and 7, assembled, arranged and secured together as hereinafter described.

The unit 4 is formed of sheet metal of suitable gage from a blank of the contour shown in Fig. 3 and having the line and V shaped incuts *a*, *b*, *c*, *d*, and *e*, which adapts the blank, when struck up in a suitable die, to be formed into the cupped V shaped form shown in Fig. 4.

A unit 5 is also formed of a sheet metal blank of the contour shown in Fig. 6, and having the V shaped incuts $g$ and $h$, which adapts the blank when struck up in a suitable die to be formed into the cupped diamond shaped unit shown in Fig. 7.

Figure 16:
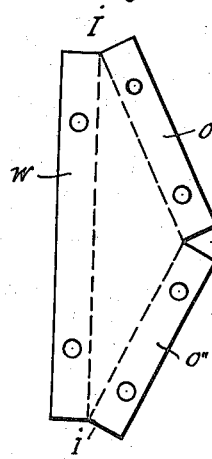
Fig. 16 shows the form of a sheet metal blank for forming the unit of construction shown in Fig. 9.

The unit 6 is also formed of a sheet metal blank of the form shown in Fig. 16 having the V shaped incuts $i$ and $j$ adapting the blank when struck up in a suitable die to form a triangular cupped block of the form shown in Fig. 9 of a size equal to one half the length of the unit 5 if divided on dotted line $x$—$x$ of Fig. 7.

Figure 17:
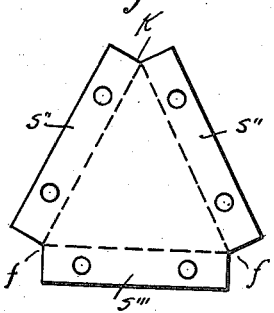
Fig. 17 shows the form of a sheet metal blank for forming the unit of construction shown in Fig. 18.
Figure 18:
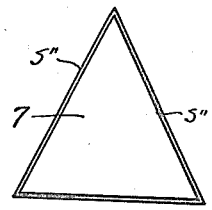
Fig. 18 is an end view of one of the units of construction.
Figure 20:
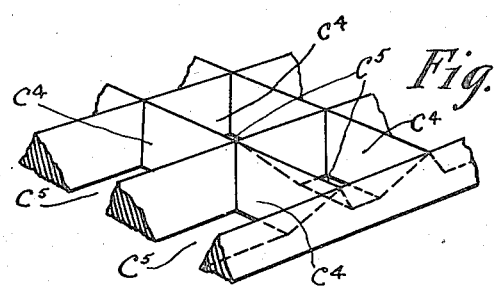
Fig. 20 is a broken away top perspective view of the valve grid of the discharge hopper.
Figure 19:
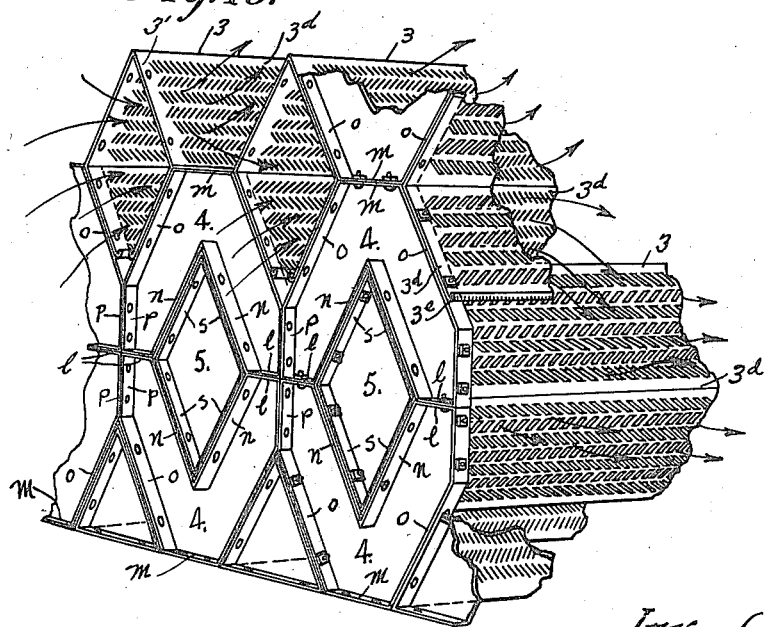
Fig. 19 is an enlarged broken away perspective view illustrating the assembling of the main units of construction.

The unit 7 is also formed of a sheet metal blank of the form shown in Fig. 17 having V shaped incuts $f$ and $k$ adapting the blank when struck up in a suitable die to form a triangular cupped unit of the form shown in Fig. 18 and of a size equal to one half of the size of unit 5 if divided on line $y$—$y$ of Fig. 7.

The unit 4 is provided with ends $l$ and $m$ and sides $n$, $o$ and $p$, which are respectively formed by bending the marginal portions $l'$, $m'$, $n'$, $o'$ and $p'$ respectively at right angles to the main body portion $q$ and the ends $l$ and $m$ and the sides $n$, $o$ and $p$ are provided respectively at uniform intervals with a plurality of perforations $r$.

The unit 5 is also provided with the sides $s$, which are formed respectively of the marginal portions $s'$ of the blank which are bent at right angles to the body portion $u$ when struck up in a die. The sides $s$ are also provided with perforations $r$ adapted to register with the perforations of the sides $n$ of the units 3.

The half units 6 are provided with sides $o''$ complementary to the sides $o$ of the units 4 and with the sides $w$ adapted to coincide with the end plates 2, and the sides $o''$ and $w$ are provided with perforations $r$ adapted to register respectively with the perforations of the sides $o$ of units 4 and the end plates 2.

The half unit 7 is provided with sides $s''$ complementary to the sides $n$ and $o$ of the units 4 and with the sides $s'''$ adapted to coincide with the bottom and top edges respectively of the sides of the hoppers B and C.

The unit 3 is formed from a rectangular sheet metal blank having the four corners provided with square incuts $z$, as shown in Fig. 10, forming end portions $3'$ and having the parallel and transverse herring-bone perforated portions $3^a$ and $3^b$, and the intervening solid portions $3^c$, and the solid marginal portions $3^d$.

To form the unit 3 the blank thus formed is bent diamond shaped in cross section along the dotted lines $v$—$v$ and $v'$—$v'$ to coincide with the sides $n$ and the outer angles of two units 4 connected together by their ends 1 in reverse position, and the end portions $3'$ are rolled inwardly cylindrical to form the holders $3^e$ to receive the clips $3^f$, as shown in Fig. 14 to form the opening $3^g$ along the lower portion of the unit 3. The marginal portions $3^d$ are provided with perforations $r$ adapted to register with the perforations of the sides $n$ of the units 4.

The top portion of the hopper C upon which is supported the main body A of the drier comprises a rectangular box formed of the sides $1^a$ and the ends $2^a$ and is mounted on suitable supports (not shown). The bottom portions of the hopper C comprise the converging sides $1^b$ and the end extensions $2^b$ which support the semi-cylindrical conveyer trough $C'$, the sides of which are a continuation of the converging sides $1^b$, and within the trough $C'$ is a screw conveyer $C^2$ the shaft of which is suitably journaled in the end extension $2^b$. Above the conveyer near the top of the hopper C is a grid $C^3$ comprising a plurality of small hoppers $C^4$, which extends in cross rows from end to end and from side to side at equal intervals, between the hopper ends $2^b$ and the sides $1^b$, with their bases in a common plane and provided with bottom openings $C^5$ and to the lower side of the grid $C^3$ are secured ways in which are mounted transversely in each of the sidewise rows of the hoppers $C^4$ a slide valve $1^d$ having openings $1^e$ which are adapted to be progressively and simultaneously registered with the openings $C^5$ as the valve slides are simultaneously moved in one direction and simultaneously and progressively closed when moved in the opposite direction, whereby when the valves are opened the grain passes uniformly through the hopper of the grid throughout the entire area according to the degree of opening.

Upon the sides and ends of the hopper C thus constructed the main body A of the drier is built up out of the units 2, 3, 4, 5, 6 and 7 as follows:—

To the top of the sides $1^a$ are first secured by their ends $m$ the number of units 4 that constitute the width of the drier A and in the triangular spaces between the base portions of the units 4 and the hopper C are inserted the triangular whole garners 8 and the half garners $8'$ formed of sheet metal and with their end portions resting on the sides $1^a$ of the hopper C and bolted to the sides $o$ of the units 4, and between the sides $n$ of each opposite pair of units 4 are mounted the lower halves of the end portions of the screen units 3 which are secured to the sides $n$ by bolts through the registered perforations $r$, and upon each of the units 4 thus secured are mounted upon the ends 1 a unit 4 in inverted position, and secured thereto by bolting the ends 1 together and the sides $n$ of the reversed units to the ends 3′ of the unit 3 in the position as aforesaid on the first tier of units 4. The second tier of the body A is completed by connecting to the sides $o$ of the inverted units 4 in the triangular spaces between and formed by the inverted units 4, the end portions of the second tier of screen units 3, and bolting together the sides $p$ of the units 4. The first and second tiers are fully completed by securing to the sides $o$ of the outer units 4, half units $3^2$, (formed by dividing a unit 3 along its upper angle) and in like manner the entire body A of the drier is built up to the desired height and capacity, the top portion comprising units 4 with their ends 1 upward and upon which are mounted the hopper B.

Each opposite pair of the upper rows of units 4 have mounted and secured to their sides $n$ the end portions of the lower half of a screen unit 3, the upper halves of the end portions of the screen units 3 being cut away to permit the sides B′ of the hopper B to rest on the ends 1 of the units 4. The ends $B^2$ of the hopper B are preferably formed of extensions of the end plates 2 of the body A.

In the hopper B above and transverse the units B are provided triangular garners $B^3$ which extend parallel between the ends $B^2$ at regular intervals adapted to uniformly distribute the grain to the spaces between the screens 3 next below the garners, whereby the grain is caused to travel through the zigzag faces around the screens 3 at all points at the same speed.

Alternate horizontal rows of the diamond shaped ends of the screens 3, beginning with the bottom row of side 1 and the second row from the bottom row of side 1′ of the main body A have fitted and secured therein the diamond shaped closure units 5, whereby alternate rows of screens 3 on the air inlet sides 1 are closed on the air inlet side 1′, and the screens 3 that are closed on the sides 1 are opened on the sides 1′. By this construction the air forced into the inlet screens is forced out of the herring-bone openings of the inlet screens through the grain which surrounds them and into the next adjacent outlet screens 3 and through the outlet screens 3 to the atmosphere through their open ends in the outlet side 1′.

The triangular openings between the units 4 of the top and bottom horizontal rows of the units 4 of the inlet side 1 of the body A are closed by the triangular closure units 7 to constitute the opposite triangular openings of the side 1′ outlet openings. The triangular openings 3 of the sides 1′ are closed by the units 6.

D represents the blower which is connected to the inlet side 1 of the drier A by the hood E and the blower is connected with the heater (not shown in Fig. 1) which heats the air delivered by the blower to the drier through the hood.

In Figs. 22, 24 and 26 are respectively shown modified forms of units $4^a$, $4^b$, and $4^{b\prime}$, which with units 5 and 6 may be used in forming sides $1^a$ and $1^{a\prime}$ in substitution for the air inlet and outlet sides 1 and 1′ respectively.

The units $4^a$ are formed of a sheet metal blank of the form shown in Fig. 21, having the angled incuts $c'$ and $e'$. The blank is struck up in a suitable die that forms square bends along the dotted line of the blank connecting the angles of the incuts (as shown in Fig. 21) to form the flange sides $m^2$, $n^2$ and $o^2$, as shown in Fig. 22.

The units $4^b$ and $4^{b\prime}$ are formed respectively of a sheet metal blank of a form respectively shown in Figs. 23 and 25 in a similar way as described for unit $4^a$ and are substantially right and left halves of unit $4^a$, the corner incuts $c'$ $e'$ and $d'$ and the side portions $o^2$ being the same in the two blanks and the sides $m^4$ and $n^4$ of the units formed therefrom (as shown in Figs. 24 and 26) being one half portions respectively of the side portions $m^2$ and $n^2$ of the blank of the unit $4^a$.

The sides of the units $4^a$, $4^b$, and $4^{b\prime}$ are also provided with perforations at standard intervals corresponding with the intervals of the perforations of the units 5 and 6, whereby the assembled units are firmly secured together to form the sides $1^a$ and $1^{a\prime}$ by bolts in like manner as hereinbefore described for the units 4, 5, 6 and 7, in forming the sides 1 and 1′.

The sides $4^a$ are assembled and secured together in reversed pairs by bolting together the sides $m^2$ and the doubled units are assembled in horizontal rows to form diamond shaped openings, the bases $m^2$ of the lower units $4^a$ of the lower horizontal rows being secured to the top of the sides of a hopper C that corresponds to the sides 1 and 1′ of the drier body and have at each end of the row the right and left half units $4^b$ and $4^{b\prime}$ respectively, as shown in Fig. 27, and each of the odd numbered horizontal rows above the lowermost corresponds with the lowermost, between which the intervening even numbered rows have their unit bases $m^2$ centrally bridging the joints of the units $4^a$ of the rows intervening, as shown in Fig. 27, whereby the diamond shaped openings are arranged in vertical alternating rows and consecutive diagonal rows, as shown in Fig. 2. The ends of alternating rows beginning with the second row above the base hopper C form with the end plates 2 semi-diagonal openings which are closed at the inlet side $1^a$ by the triangular units 6 and are left open on the outlet side $1^{a\prime}$, as shown in Fig. 27.

The sides 1ª and 1ª' of the body of the drier being thus constructed the screen units 3 are adapted to be assembled therewith in like manner with the sides 1 and 1', and when so assembled with the closure units 5 and 6 applied to the diamond shaped opening as described for the sides 1 and 1', the body A in respect to diagonal grain passages is the same as shown in Fig. 2 in which the stream of grain passing over the top angle of the next lower screen, which operates also as a means of constantly shifting the individual kernels from the center of the moving screens toward the screens and from the screens toward the center of the streams whereby greater uniformity of drying is obtained without providing other means to that end.

Without varying the principle of construction described a combined drier and cooler, as shown in Fig. 15 may be constructed by inserting a grid and valve similar to that of the hopper C, centrally of the body A' and so connecting the blower to the lower half portion that the air will be drawn through the screens 3 of the lower half and delivered through the heater into the screens 3 of the upper half in like manner as described, by which construction it is manifest that the heat extracted from the grain by the air passing through the lower half will lessen the expense of heating the heater to a required degree, and a combined drier and cooler thus constructed and operated, it is manifest, is also adapted to dry and cool by batches or continuously.

It is also manifest that any unit of the drier body A may be removed and replaced with a similar unit without the necessity of removing any other unit, which greatly facilitates and reduces the cost of repairing the drier.

It is also manifest that the capacity of the body A of the drier may be readily increased by adding construction units as described to its top.

It is manifest also that the construction shown and described utilizes substantially the entire space within the drier body A for the passage of grain and the unobstructed circulation of air uniformly therethrough, whereby I secure the maximum drying capacity per unit of space occupied by the drier body, and it is apparent also that the arrangement of the air screens is such that the weight of the grain column is evenly distributed throughout its height by the air screens to the sides of the drier body, and that the density of grain is no greater at the bottom than at the top of the column.

What I claim to be new is—

1. In a grain drier, an elongated, rectangular upright hollow drier body, having opposite air inlet and outlet sides provided with corresponding horizontal and vertical parallel rows of equal diamond shaped openings at regular intervals, end plates connecting the inlet and outlet sides, hollow screens, diamond shaped in cross section, extending horizontally through the body of the drier with their ends secured, one in each opposite pair of openings of the sides, and closures for the screens closing each screen at one end, alternate horizontal rows of the screens being closed at the inlet side and open at the outlet side, and alternate horizontal rows being open at their inlet ends and closed at their outlet ends, and means to deliver heated air into the screens that are open at the inlet side of the drier body.

2. In a drier body, an elongated, rectangular, upright, hollow drier body, having opposite and equal air inlet and outlet sides, each provided with a multiplicity of equal diamond shaped openings, arranged at regular intervals in horizontal rows, and with the openings of alternate horizontal rows forming separate and alternate vertical rows, and with the openings of the horizontal and vertical rows leaving intersecting diagonal portions of the sides of equal widths, end plates connecting the inlet and outlet sides, hollow screens diamond shaped in cross section, one extending between each opposite pair of openings in the inlet and outlet sides, and having its end portions fitted and secured to the sides of the openings and forming diagonal intersecting spaces opposite and between the diagonal intersecting side portions of the inlet and outlet sides, closures for the ends of the screens, and closing one end of each screen, each alternate horizontal row of the screens being closed at their ends in the inlet side and open at their ends in the outlet side, and each other horizontal row being closed at their ends in the outlet side and open at their ends in the inlet side, means to deliver heated air into the screens that are open in the inlet side and means to regulate the passing of grain through the drier body.

3. In a grain drier, an upright, elongated, rectangular hollow body comprising opposite equal air inlet and outlet sides, and end plates connecting the sides, said sides being formed of a multiplicity of flanged structural units, adapted when connected side by side by their flanges, in horizontal rows, and the horizontal rows being alternately inverted and connected by their end flanges, to build up the sides and form therein horizontal and vertical rows of diamond shaped openings, with diagonal intersecting portions of the sides of uniform width between the openings, with semi-diamond shaped openings at the ends of alternate horizontal and vertical rows, a multiplicity of hollow screens each formed of a perforated plate of sheet metal bent diamond shaped in cross section, said screens cross connecting the inlet and outlet sides, with their end portions fitted and secured to the flanges of the units forming the diamond shaped openings of the sides, diamond shaped closures units for the ends of the screens, one closure for each screen, said closure units being secured to close the ends of alternate horizontal rows of the screens that are connected to the inlet side, and to close the ends of the other horizontal rows of screens that are secured to the outlet side, means to deliver heated air into the screens that are open in the inlet side, and means to regulate the passage of grain through the drier body.

4. In a grain drier, the combination of an upright, elongated, rectangular drier body, having a pair of opposite sides each provided with a multiplicity of diamond shaped openings opposite the openings of the other, and a multiplicity of hollow screens, each formed of a perforated plate bent diamond shaped at its end portions to fit into and adapted to be secured to the sides of the diamond shaped openings of the sides of the drier body, and having the body portion between its end portions also diamond shaped in cross section excepting that it has a narrow longitudinal opening instead of the lower angle of the end portions.

In testimony whereof I have hereunto set my hand at Toledo, Ohio, this 9th day of October, 1916.

OLIVER W. RANDOLPH.

In presence of—
R. B. SONESEMS,
A. KUEFER.